United States Patent Office 2,897,879
Patented Aug. 4, 1959

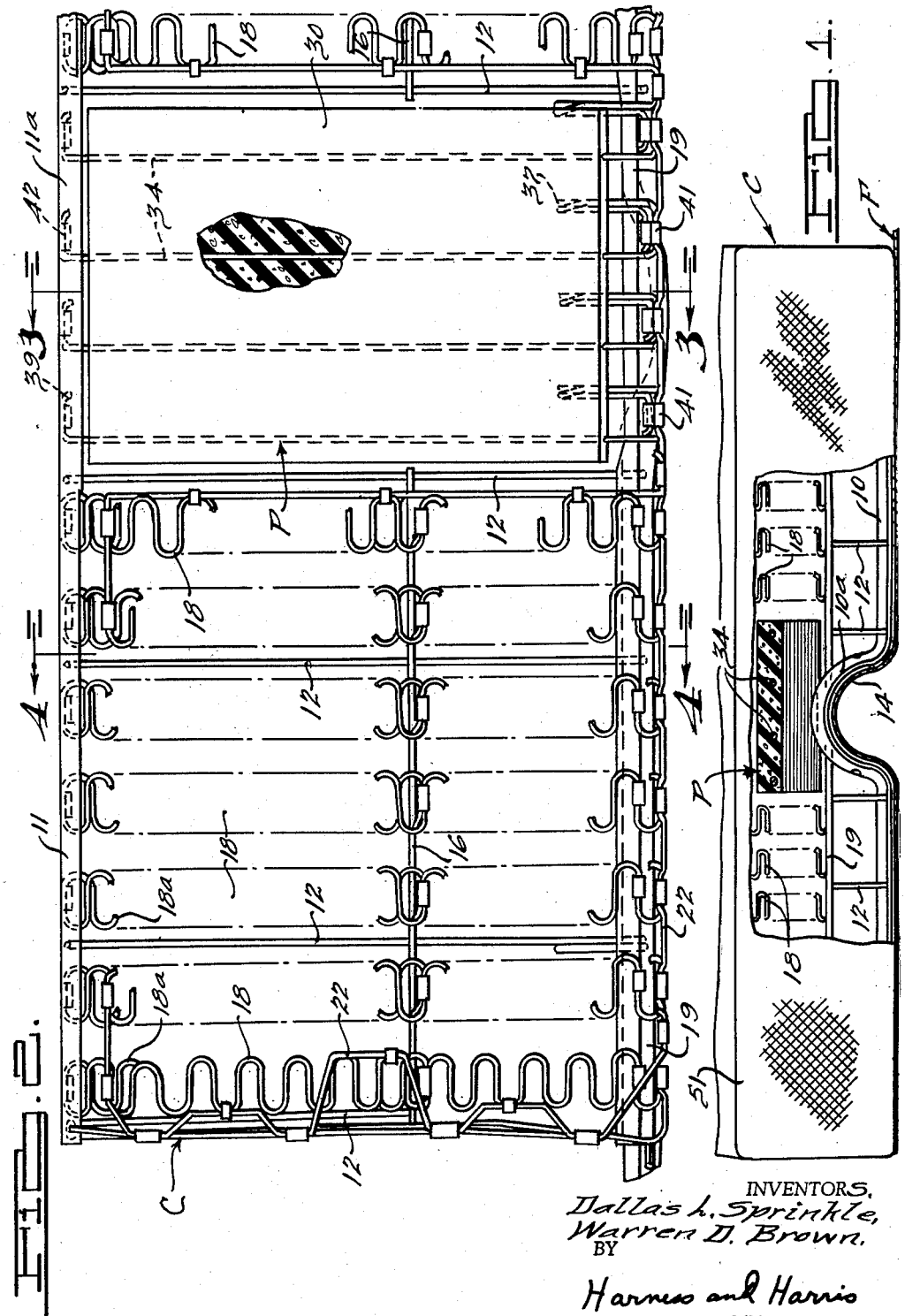

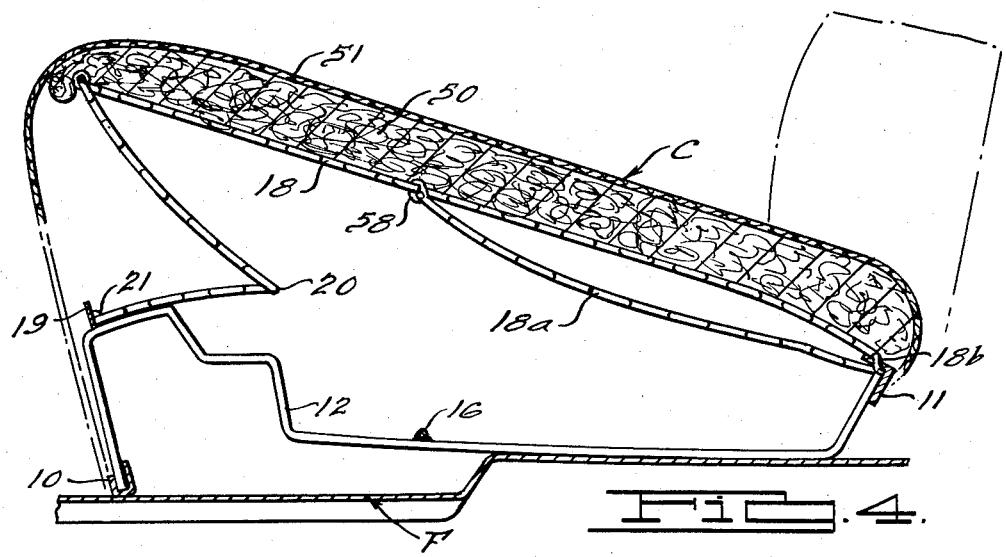
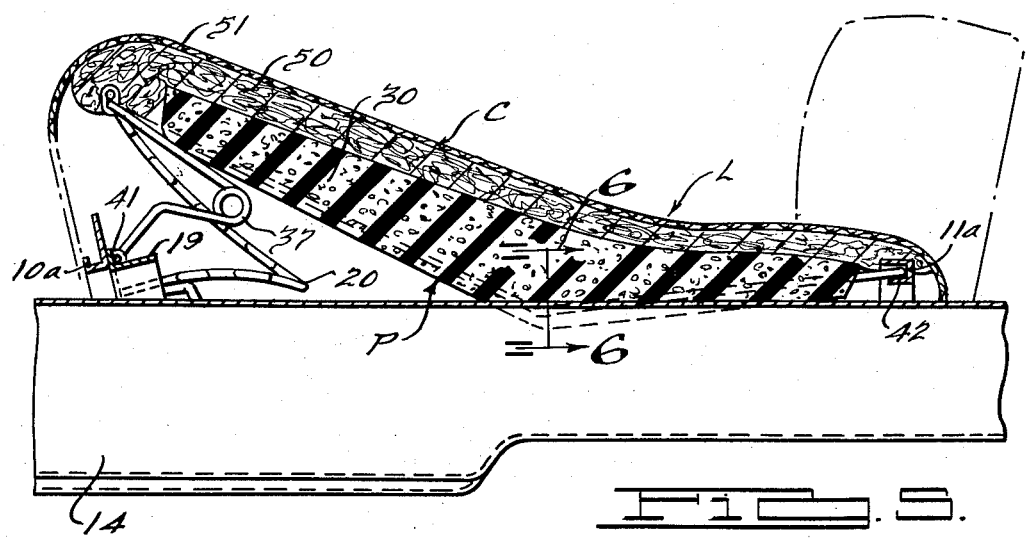
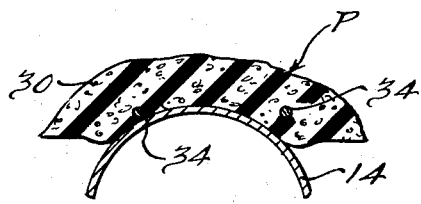

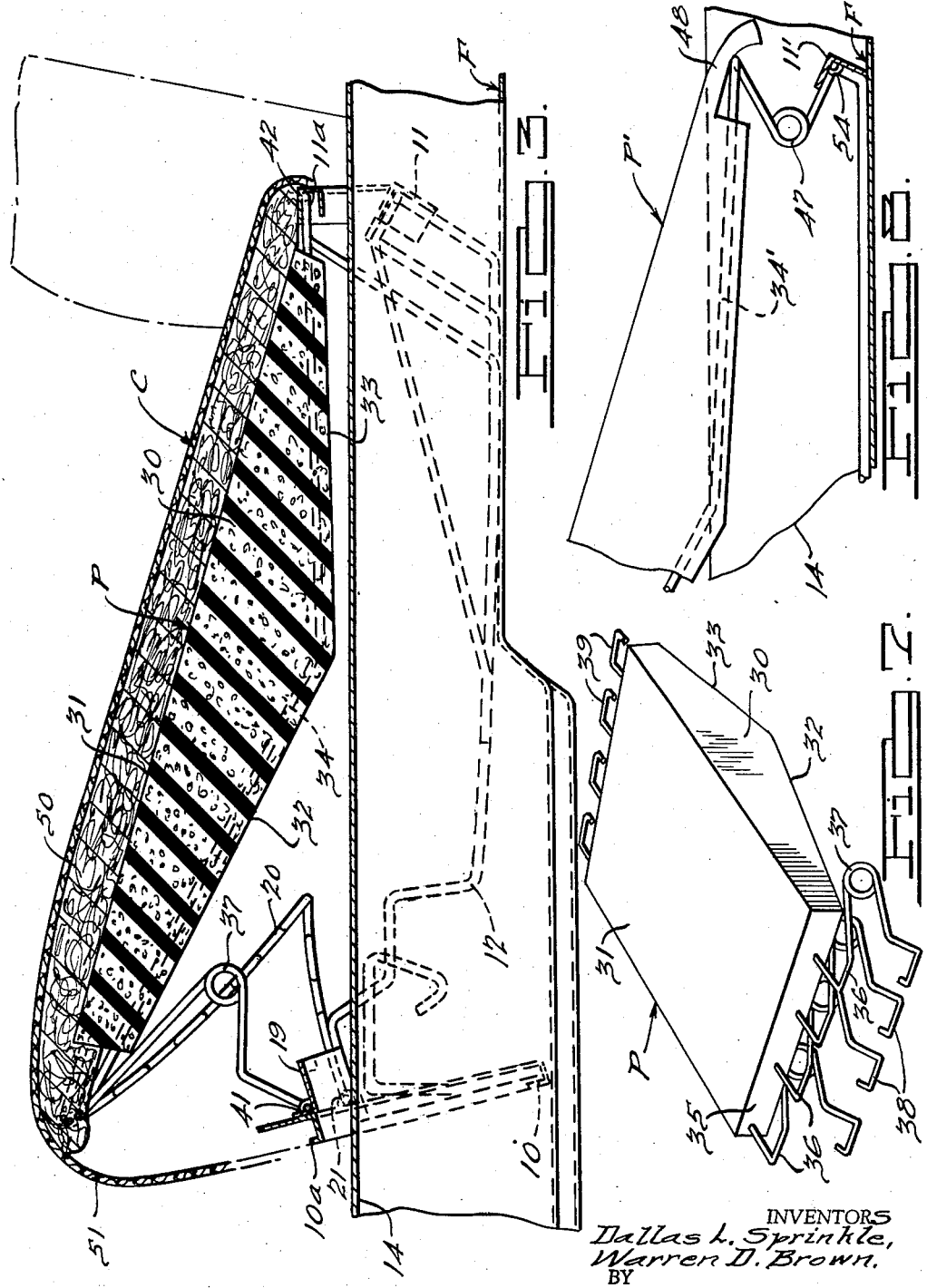

2,897,879

CUSHION SPRING UNIT

Warren D. Brown and Dallas L. Sprinkle, Birmingham, Mich., assignors to Chrysler Corporation, Highland Park, Mich., a corporation of Delaware Application July 25, 1957, Serial No. 674,120

4 Claims. (Cl. 155—179)

This invention relates to vehicle seats and particularly to seat cushion units therefor wherein at least a portion of the cushion seating surface is composed of a plurality of wire spring strips or rods embedded in a resilient pad of a rubber-like material or some elastic foam material.

It is a primary object of this invention to provide a vehicle seat cushion unit having a spring strip type of load supporting surface at least a portion of which includes a relatively thick resilient pad connected to a plurality of wire rods or strips so that the wire rods and the resilent pad act in series to resiliently support the loads applied to the aforedescribed pad defined portion of the seat unit.

It is another object of this invention to provide a vehicle seat unit having a combination wire rod and resilient pad load supporting surface wherein the pad and wire rods are so arranged that a minimum seat thickness may be achieved.

It is still another object of this invention to provide a vehicle seat construction having portions of the load supporting surface composed of a resilient pad and connected spring strips or wire rods wherein the pad material functions as a spring unit in series with the wire rods and at the same time acts as an insulator for the rods or strips.

It is still another object of this invention to provide a combination wire rod and resilient pad seat supporting unit wherein the rods are embedded in the resilient pad and include jack-spring formations and/or torsion bar formations to cooperate with the inherent resilience of the pad to springingly support the seat load.

It is still another object of this invention to provide a resilient pad unit having wire rods embedded therein and projecting from the ends thereof wherein the pad has flanges that overlie and cushion the projecting ends of the wire rods.

Other objects and advantages of this cushion spring unit will become readily apparent from a reading of the following description and a consideration of the related drawings wherein:

Fig. 1 is a front end elevational view of a vehicle seat unit embodying this invention, portions being broken away for clarity;

Fig. 2 is an enlarged, fragmentary, top plan view of the vehicle seat unit shown in Fig. 1, the seat cover fabric and top pad being removed;

Fig. 3 is an enlarged sectional elevational view taken along the line 3—3 of Fig. 2 showing the seat in unloaded condition;

Fig. 4 is an enlarged sectional elevational view taken along the line 4—4 of Fig. 2 showing the seat in unloaded condition;

Fig. 5 is another sectional elevational view similar to Fig. 3 but showing the seat in a loaded condition;

Fig. 6 is a fragmentary sectional elevational view taken along the line 6—6 of Fig. 5;

Fig. 7 is a perspective view of the combination wire rod and resilient pad unit that is utilized in the central section of the seat unit load supporting surface shown in Figs. 1 and 2; and Fig. 8 is a fragmentary sectional elevation view of a seat unit embodying a modified form of this invention.

The vehicle seat cushion unit C shown in the drawings includes a base frame formed from front and rear rails 10 and 11 respectively that are interconnected by a plurality of spaced tie bars 12. Tie bars 16 are also shown extending longitudinally of the tie bars 12 between the front and rear rails 10, 11. The front and rear base frame rails 10, 11 are each formed with a semi-circular kick-up 10a and 11a respectively so that the base frame rails can matingly fit over the tunnel formation 14 that extends along the vehicle body floor F. This tunnel formation 14 is adapted to receive the vehicle propeller shaft that connects the forwardly located engine (not shown) to the rearwardly located driving wheels (not shown). Tunnel formations, such as 14, have become prevalent in motor vehicles due to the desire to lower the height of vehicle bodies to the limits permitted by road clearance, passenger comfort, and the like.

Forming the end portions of the load supporting surface of the seat unit C are a plurality of extensible, sinuously shaped, spring strips 18. Spring strips 18 bridgingly extend between a raised front support rail 19 and the rear base frame rail 11. Spring strips 18 are preferably spaced apart and their ends are pivotally anchored to the rails 19, 11 by preformed sleeve formations 21, clips, slots, or the like. The front ends of the spring strips 18 are each provided with a reversely bent, substantially V-shaped, formation 20, known in the trade as a fish-mouth formation, to provide the required resilience and hinging action at the cushion front edge. An upper border frame wire 22 may extend about the ends and front edge of the seat cushion load supporting surface to interconnect the several opening strips 18.

It will be noted from Figs. 1 and 2 that the sinuous spring strip elements 18 provide a considerable portion of the load supporting surface of the cushion unit C but that a pad unit P forms the load supporting surface at the center section of the cushion. Pad P overlies the raised tunnel formation 14. The pad unit P is a primary part of the invention herein disclosed. Because of the raised tunnel formation 14, it is not expedient to use spring strips 18 at that section of the cushion unit that overlies the tunnel 14 because the spring strips 18 will deflect to such an extent under load that they will bottom on the raised tunnel formation 14. To permit the use of a relatively thin seat cushion C on a floor section that has a restricted spring deflection depth, it has been found that the pad unit P gives optimum seating comfort with minimum seat deflection. Furthermore, it has been found that a pad such as the pad P gives a load supporting action that is comparable to and feels like the other sections of the seat unit that utilize the spring strips 18 for resilient load support.

Pad section P comprises a pad of substantially triangularly or actually pentagonal cross-sectional configuration that is formed of some resilient material 30 such as foam rubber, a polyurethane or a similar foam, rubberized hair, or any other similar material. The base side 31 of pad P is arranged to be co-planar with the cushion load supporting surface formed by the adjacent spring strips 18. The sides 32 and 33 of the pad P converge downwardly towards the seat supporting floor F. Imbedded in the pad P are a plurality of spaced apart, longitudinally straight, wire rods 34 that extend transversely of the pad P and have ends that project beyond the front and rear edges of the pad. The portions of the rods 34 that project from the front edge 35 (see Fig. 7) of pad P are bent to provide a torsion bar part 36 and a connected jack-spring portion 37. The jack-spring portion 37 is essentially a V-shaped section with a coil formation at the vertex thereof resiliently interconnecting the two converging legs of the V-shaped section 37. The free end of the V-shaped section 37 is formed with another torsion bar portion 38 that is adapted to be pivotally anchored to the seat unit upper front support rail 19. The rearwardly projecting ends of the rods 34 are also formed with torsion bar portions 39 that are adapted to be pivotally connected to the rear base frame rail portions 11, 11a by sleeve-like connections 42.

While the body portions of the pad rods 34 are not extensible, still, the torsion bar portions 36, 38, 39 at the opposite ends of the rods as well as the jack-spring formation 37 on the rods 34 provide a certain amount of resilience that is combined with the inherent resilience of the compressible pad material 30 to provide a comfortable seat load supporting surface. It will also be noted that the body portions of the rods 34 are bent to a V-shape configuration so that they conform to the shape of the lower sides 32, 33 of the resilient pad P. By shaping the rod body portions in this manner a maximum amount of the pad material 30 is placed above the rods 34 to resiliently support the loads applied to the seat supporting surface. The rods 34 are sufficiently embedded in the pad P so that they will not rub against the floor F or tunnel 14 when the seat is loaded (see Figs. 5 and 6) and cause an objectionable metal-to-metal contact noise. While the rods 34 are herein shown as integrally bonded in the pad P, still, it is within the teachings of this invention to form slots in the lower sides of the pad P and detachably seat the rods 34 in the pad slots. The slots would be of such a depth that the rods 34 would be completely insulated during compression loading of the pad P.

It is also within the scope of this invention to have straight rather than V-shaped rods 34 embedded in the resilient pad P. Obviously with straight rods less thickness of padding might be located above the rods but such might be completely satisfactory depending on the type of pad material, what the underlying floor shape happened to be, the particular location and type of loading applied to the seat, the type of jack-spring or torsion bar spring formation on the ends of the rods, and various other factors that affect the overall pad resilience.

It will be noted that the cushion spring unit formed by the combination of spring strips 18 with the resilient pad P is covered by a top pad 50 and a casing or cover fabric 51. Top pad 50 can be cotton, kapok, sisal, sponge rubber, rubberized hair, or any of the other known materials utilized as top pad materials. The top pad 50 should extend over the front and rear edges of the cushion spring supporting unit so that these edges will not be objectionable from either a comfort or an appearance standpoint.

A comparison of Fig. 3 with Figs. 5 and 6 shows the reshaping of the pad P when a heavy load L is applied to the central section of cushion C. It will be noted that under heavy load the vertex portion of pad P is pressed down about the tunnel formation 14 so that it contacts the tunnel 14 for approximately the back half of the pad width. However, from Fig. 6 it will be noted that even when loaded the rods 34 are completely insulated from the tunnel 14 and that there is a very sizeable mass of resilient material 30 located between the top of tunnel 14 and the top of the pad unit. Thus, even though the seat load supporting surface overlying the tunnel 14 can deflect downwardly only a minimum amount, still, a very acceptable seating surface is provided over the tunnel throughout all portions of the cushion load supporting area.

Fig. 8 shows a modified form of this invention wherein the resilient foam pad P′ is made of sufficient thickness so that it includes an integral top pad portion that replaces the separate pad 50 shown in Figs. 3–5. Pad P′ provides flanges 48 at the front and rear edges of the cushion unit to wrap about and cushion the edges of the spring unit. The rods 34′ that are embedded in the foam pad P′ are herein shown as having a jack-spring portion 47 formed on their rear end portions. Jack-springs 47 are connected to the rear base frame rail 11′ by a pivotal connection 54. The front ends of the rods 34′ (not shown) may have jack-spring formations similar to the formations 37 shown in Figs. 3 and 5.

Another novel feature of the spring cushion unit C that should be pointed out, but which does not form a part of this particular invention, is the tension spring portions 18a (see Fig. 4) formed on the rear portions of the spring strips 18. It will be noted that the sinuous spring strips 18 have their rear end portions 18a reversely bent under the main support portions 18 to provide an underlying spring loop. The anchor portions 18b of the strips 18 are pivotally anchored in slots in the rear frame 11 as is thought to be obvious from Fig. 4. The portions 18a of strips 18 are tensioned between the rear rail 11 and a clip 58 connected to a mid-portion of the span of the spring strips 18. It has been found that the preloading of the rear portions of the spring strips 18 by the tensioned connector strips 18a provides a very economical form of rear anchor formation that gives a desirable hinging action for the rear end of the hinge strip and also utilizes a minimum of space under the seat supporting surface.

While the drawings and description heretofore have been directed primarily at a seat supporting surface wherein the foam pad P or P′ is used in only a portion of the seat supporting surface, still, it is to be understood that this invention covers a cushion construction wherein any portion or all of the seat load supporting surface is formed of a resilient pad having wire rods or strips connected to or embedded therein as herein suggested.

We claim:

1. A cushion spring unit comprising a support having spaced, opposed, rails and a resilient load supporting surface including a plurality of spaced, longitudinally straight, load supporting wire rods bridgingly extending between said rails and a relatively thick resilient pad of foam-like material seated on and enveloping the load supporting portions of said rods, said rods having the end portions thereof projecting from opposite sides of said pad and at least one of said projecting rod end portions being formed to provide a depending jack-spring element and the other projecting end portion of said rods being formed with a transversely extending torsion bar spring element.

2. A spring unit for a cushion or the like comprising a plurality of spaced, longitudinally straight, parallel rods having depending spring units formed at each end thereof and a pad of resilient foam material bonded to the intermediate, load supporting body portions of said rods and arranged to provide a relatively thick, compressible, load supporting portion above said rods and a rod insulating portion beneath said rods, said rod body portions being of a longitudinally dished configuration in their intermediate load supporting portions and said pad having a flat top surface and a dished lower surface that substantially conforms to the shape of the rod body portions.

3. A cushion spring unit comprising a support having a pair of opposed sides, a plurality of longitudinally extensible, sinuously-shaped, spring strips bridging the space between said pair of opposed frame sides for a portion of the length of said sides and providing an elevated load supporting surface thereabove, a unitary spring supported resilient pad element arranged adjacent to said spring strips with the top surface of said pad aligned with the load supporting surface of said spring strips, said pad having a plurality of spaced, longitudinally straight, wire rods embedded therein and extending therethrough with the opposite ends thereof projecting from said pad and connected to the said opposed sides of said support, said rods each having a depending spring element formed on at least one end thereof, said spring strips and said resilient pad being so constructed and arranged to conjointly provide a coplanar load supporting surface of substantially uniform load supporting characteristics.

4. A cushion spring unit comprising a support having a pair of opposed side portions, a plurality of longitudinally extensible, sinuously-shaped, spring strips bridging the space betwen said pair of opposed side portions for a portion of the length of said sides and providing an elevated load supporting surface thereabove, a unitary spring supported resilient pad element arranged adjacent to said spring strips with the flat top surface of said pad aligned with the load supporting surface of said spring strips, said pad having a plurality of spaced, longitudinally straight, wire rods embedded therein and extending therethrough with the opposite ends thereof projecting from said pad and connected to the said opposed side portions of said support, said rods each having a depending jack-spring element formed on one end portion and a transversely extending torsion bar spring element formed on the other end thereof, said spring strips and said resilient pad being so constructed and arranged to conjointly provide a coplanar load supporting surface of substantially uniform load supporting characteristics.

References Cited in the file of this patent

UNITED STATES PATENTS

| 2,248,093 | Kronheim et al. | July 8, 1941 |
| 2,281,341 | Turner | Apr. 28, 1942 |

FOREIGN PATENTS

| 814,509 | Germany | Sept. 24, 1951 |